(12) United States Patent
Nádas et al.

(10) Patent No.: US 12,355,677 B2
(45) Date of Patent: Jul. 8, 2025

(54) FAIR HIERARCHICAL QUALITY OF SERVICE MARKING

(71) Applicant: Telefonaktiebolaget LM Ericsson (publ), Stockholm (SE)

(72) Inventors: Szilveszter Nádas, Santa Clara, CA (US); Sandor Laki, Budapest (HU); Gergo Gombos, Budapest (HU); Ferenc Fejes, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/274,043

(22) PCT Filed: Mar. 30, 2021

(86) PCT No.: PCT/IB2021/052665
§ 371 (c)(1),
(2) Date: Jul. 25, 2023

(87) PCT Pub. No.: WO2022/208134
PCT Pub. Date: Oct. 6, 2022

(65) Prior Publication Data
US 2024/0414100 A1  Dec. 12, 2024

(51) Int. Cl.
H04L 47/80  (2022.01)
H04L 45/302 (2022.01)
H04L 47/24  (2022.01)

(52) U.S. Cl.
CPC .......... *H04L 47/805* (2013.01); *H04L 45/302* (2013.01); *H04L 47/24* (2013.01)

(58) Field of Classification Search
CPC ...... H04L 47/805; H04L 47/24; H04L 45/302
(Continued)

(56) References Cited

U.S. PATENT DOCUMENTS

| | | | |
|---|---|---|---|
| 2010/0278190 A1 | 11/2010 | Yip et al. | |
| 2015/0117220 A1* | 4/2015 | Turanyi | H04L 47/32 370/236 |
| 2016/0105369 A1* | 4/2016 | Nadas | H04W 28/02 370/392 |
| 2018/0048551 A1 | 2/2018 | Lee et al. | |
| 2020/0127933 A1* | 4/2020 | Nádas | H04L 47/56 |

(Continued)

FOREIGN PATENT DOCUMENTS

| | | |
|---|---|---|
| CN | 102640457 B | 1/2015 |
| WO | 2016007053 A1 | 1/2016 |

(Continued)

OTHER PUBLICATIONS

Szilveszter Nadas et al., "Per Packet Value: A Practical Concept for Network Resource Sharing." Dec. 2016, 2016 IEEE Global Communications Conference (GLOBECOM), https://ieeexplore.ieee.org/stamp/stamp.jsp?tp=&arnumber=7842125 (Year: 2016).*

(Continued)

*Primary Examiner* — Ruolei Zong
(74) *Attorney, Agent, or Firm* — COATS & BENNETT, PLLC

(57) ABSTRACT

A computing device (150) identifies a plurality of regions of a Throughput Value Function, TVF (200). The TVF (200) maps throughput values to packet values for a plurality of subflows. The computing device (150) periodically updates a plurality of matrices comprising a matrix of resource sharing weights and a region determination matrix. The computing device (150) marks a packet (180) with a packet value based on the plurality of matrices. The packet (180) is received in one of the subflows.

21 Claims, 17 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2020/0382427 | A1* | 12/2020 | Nádas | H04L 47/2441 |
| 2021/0409335 | A1* | 12/2021 | Zhu | H04L 47/24 |
| 2023/0198910 | A1 | 6/2023 | Tourrilhes et al. | |

FOREIGN PATENT DOCUMENTS

| | | | | | |
|---|---|---|---|---|---|
| WO | WO-2018188770 | A1 * | 10/2018 | ........... | H04L 41/142 |
| WO | WO-2019141380 | A1 * | 7/2019 | ........... | H04L 47/215 |
| WO | 2020229905 | A1 | 11/2020 | | |

OTHER PUBLICATIONS

Sándor Laki et al., "Core-Stateless Forwarding With QoS Revisited: Decoupling Delay and Bandwidth Requirements," Dec. 2020, IEEE/ACM Transactions on Networking, vol. 29, Issue: 2, https://ieeexplore.ieee.org/stamp/stamp.jsp?tp=&arnumber=9288874 (Year: 2020).*

Aki, S. et al., "Core-Stateless Forwarding With QoS Revisited: Decoupling Delay and Bandwidth Requirements", IEEE/ACM Transactions on Networking, vol. 29, No. 2, Apr. 2021, pp. 503-516, IEEE.

Adams, R., "Active Queue Management: A Survey", IEEE Communications Survey & Tutorials, vol. 15, No. 3, Third Quarter 2013, pp. 1425-1476, IEEE.

* cited by examiner

| INDEX (I) | RATE (S) | WEIGHT (w) | NORMALIZED WEIGHT | WEIGHTED RATE | UTILIZATION RANK |
|---|---|---|---|---|---|
| 1 | 6 | 2 | 0.5 | 12 | 2 |
| 2 | 2 | 1 | 0.25 | 8 | 1 |
| 3 | 4 | 1 | 0.25 | 16 | 3 |

Input: New rate measurements for TAs: $S_1, ..., S_n$

1 begin
2    Calculate ordered-indexing: $o_1, ..., o_n$;
3    Note: $S_{o_i}/w_{o_i} \leq S_{o_j}/w_{o_j}, (i<j)\ \forall\ i,j \in [0,n]$;
4    $B_0 = 0$;
5    for $i \leftarrow 1$ to $n$ do
6       $R_{0,i} \leftarrow 0$;
7    for $j \leftarrow 1$ to $n$ do
8       for $i \leftarrow j$ to $n$ do
9          $W_{j,i} \leftarrow w_{o_i}/\sum_{k=j}^{n} w_{o_k}$;
10    for $j \leftarrow 1$ to $n$ do
11       $\delta_j \leftarrow (S_{o_j} - R_{j-1,j})/W_{j,j}$;
12       $B_j \leftarrow B_{j-1} + \delta_j$;
13       for $i \leftarrow j$ to n do
14          $R_{j,i} \leftarrow R_{j-1,i} + \delta_j \times W_{j,i}$

FIG. 8

Input: TA index $l \in [1, n]$
Rate parameter $r \in [0, S_l]$

Output: Transformed rate $r_{tr} \in [0, \sum_{k=1}^{n} S_k]$

1 begin
2 Find $i \in [1, n]$, such that $o_i = l$;
3 Find $j \in [1, i]$, such that $R_{j-1,i} < r \leq R_{j,i}$
4 $r_{tr} \leftarrow B_{j-1} + (r - R_{j-1,i}) / W_{j,i}$

FIG. 10

FAIR HIERARCHICAL QUALITY OF SERVICE MARKING

TECHNICAL FIELD

This application generally relates to the field of computer networking, and more particularly relates to packet processing performed by a computing device in a computer network.

BACKGROUND

Communication networks are shared among a wide variety of applications and services with different requirements. Some applications require low latency and high throughput while other applications and services require best effort only. At the same time, sharing of network resources by different operators is becoming more common. Network slicing is a solution for sharing resources between operators that can also accommodate the widely varying Quality of Service (QoS) requirements of different users. The general idea underlying network slicing is to separate traffic into multiple logical networks that share the same physical infrastructure. Each logical network is designed to serve a specific purpose and comprises all the network resources required for that specific purpose. Network slices can be implemented for each operator and for each service provided by the operator.

The heterogenous traffic mix comprising different flows for different users carried by different network operators and with different QoS requirements poses a challenge for access aggregation networks (AANs). The network needs to ensure that network resources are shared fairly between different flows while maintaining the required QoS for each flow. Without some form of direct resource sharing control, unfairness in the treatment of different flows is likely to occur.

Most networks have relatively few and simple mechanisms to rely on in order to approximate flow fairness. For example, Transmission Control Protocol (TCP) has some very limited congestion control mechanisms built in. However, despite these limited mechanisms, new congestion controls and heterogenous Round Trip Times (RTTs) often result in unfairness among flows anyway. Further, these limited mechanisms are often unable to prevent user with several flows from dominating resource usage over a single bottleneck.

Another relatively simple approach that attempts to ensure that certain traffic is provided with at least a minimum level of QoS is by implementing a static reservation solution. Static reservation traditionally requires defining in advance the bitrate share of each user's combined traffic. Because users often have highly variable utilization, a static reservation approach often results in high amounts of unused resources.

In comparison to these legacy approaches, Hierarchical Quality of Service (HQoS) by Scheduling, a technique for resource sharing and QoS management, can implement a richer and more complex set of policies. HQoS uses a scheduler and many queues to implement and enforce a resource sharing policy among different traffic aggregates (TAs) and among different flows within a TA. The HQoS approach organizes managed elements of the network into a hierarchy and applies QoS rules at each level of the hierarchy in order to create more elaborate, refined, and/or sophisticated QoS solutions for shared resource management. With HQoS, resource sharing can be defined among several TAs at different hierarchical levels, e.g., among operators, network slices, users and subflows of a user. HQoS can also be used to realize statistical multiplexing of a communication link.

HQoS is complex and requires configuration at each bottleneck in a network. With the evolution of Fifth Generation (5G) networks and optical fiber for the last hop, bottlenecks will become more likely at network routers. The traffic at these routers is heterogenous considering congestion control mechanisms and round trip time (RTT). The traffic mix is also constantly changing. Controlling resource sharing at these bottlenecks can significantly improve network performance and perceived QoS.

A technique that is often used in conjunction with HQoS is known as packet marking. Packet marking involves adding information to a packet for potential use by downstream devices and/or processing. For example, an edge router may use packet marking to insert a packet value into a packet that indicates that packet's importance in the traffic mix at the edge of the network. The packet value may then be used by schedulers in other network nodes along the path traversed by the packet to ensure that the packet is prioritized based on its packet value as it traverses the network towards its destination. Packet marking has proven to be a useful technique to enable effective bandwidth sharing control and traffic congestion avoidance within a network.

A core stateless resource sharing mechanism called Hierarchical Per Packet Values (HPPV) implements HQoS by only modifying packet marking algorithms without any changes to the schedulers in the network nodes. In this approach, the resource sharing policies between different TAs are defined by the packet marking strategy. No knowledge of the resource sharing policies is required by the scheduler. With this approach, HQoS can be implemented with a simple scheduler that determines the handling of a packet based only on its packet value. An advantage of this approach is that new policies can be introduced by reconfiguring packet marking without making any changes to the scheduler.

Despite the availability of these general approaches, there continues to be a need for improved approaches to ensuring weighted fairness for a plurality of subflows traversing modern networks. In general, the complexity of shared resource management techniques is limited by the computational burden of known approaches.

SUMMARY

Embodiments of the present disclosure are generally directed to solutions that enable efficient packet marking. One or more embodiments include a method implemented by a computing device. The method comprises identifying a plurality of regions of a Throughput Value Function (TVF). The TVF maps throughput values to packet values for a plurality of subflows. The method further comprises periodically updating a plurality of matrices comprising a matrix of resource sharing weights and a region determination matrix. The method further comprises marking a packet with a packet value computed based on the plurality of matrices and the TVF. The packet is received in one of the subflows.

In some embodiments, the matrix of resource sharing weights indicates, for each of the subflows, a relative weight of the subflow in each of the regions.

In some embodiments, marking the packet with the packet value based on the plurality of matrices comprises transforming a random rate parameter using a first value comprised in the matrix of resource sharing weights and a second value comprised in the region determination matrix, and using the transformed random rate parameter as an input to the TVF to determine the packet value. In some such embodiments, the method further comprises selecting the random rate parameter from a limited range of values comprising a maximum value. The maximum value is a measured throughput of the subflow comprising the packet.

In some embodiments, the method further comprises periodically receiving a rate measurement for each of the subflows. Periodically updating the region determination matrix comprises periodically updating the region determination matrix based on the rate measurements.

In some embodiments, identifying the plurality of regions of the TVF comprises calculating, for each of the regions of the TVF, a width of the region and an upper boundary of the region. The width of an initial region of the plurality of regions is calculated to be at least as wide as a smallest of the rate measurements combined with a proportional amount of each of the other rate measurements. The proportional amount, for each of the other rate measurements, is the other rate measurement weighted according to a resource sharing ratio between the subflow of the smallest rate measurement and the subflow of the other rate measurement. The upper boundary of the initial region is calculated as a lowest throughput value mapped by the TVF plus the width of the initial region. In some such embodiments, a remainder of each of the other rate measurements is the other rate measurement less the proportional amount of the other rate measurement. The width of a region adjacent to the initial region is calculated to be at least as wide as the remainder of a smallest of the other rate measurements combined with a further proportional amount of each rate measurement larger than the smallest of the other rate measurements. The further proportional amount is, for each of the rate measurements larger than the smallest of the other rate measurements, the remainder of the larger rate measurement weighted according to a resource sharing ratio between the subflow of the smallest of the other rate measurements and the subflow of the larger rate measurement. The upper boundary of the region adjacent to the initial region is calculated as the upper boundary of the initial region plus the width of the region adjacent to the initial region.

In some embodiments, the method further comprises receiving a resource sharing weight for each of the subflows. Periodically updating the matrix of resource sharing weights comprises periodically updating the matrix of resource sharing weights with the relative weight of each subflow in each of the regions of the TVF.

In some embodiments, the method further comprises calculating an index reordering vector comprising identifiers of the subflows ordered by throughput-to-weight ratio. In some such embodiments, each of the subflows has a corresponding weight. The method further comprises periodically determining, for each of the subflows and with respect to each of the regions of the TVF, a ratio of the weight of the subflow relative to a sum of the weights of the other subflows. Periodically updating the plurality of matrices comprises periodically updating values of the matrix of resource sharing weights with the determined ratios of the weights according to the ordering of the index reordering vector.

In some embodiments, the TVF maps throughput values to packet values differently for each of the subflows.

Other embodiments include a computing device configured to identify a plurality of regions of a TVF. The TVF maps throughput values to packet values for a plurality of subflows. The computing device is further configured to periodically update a plurality of matrices comprising a matrix of resource sharing weights and a region determination matrix. The computing device is further configured to mark a packet with a packet value computed based on the plurality of matrices and the TVF. The packet is received in one of the subflows.

In some embodiments, the computing device is further configured to perform any one of the methods described above.

Other embodiments include a computing device comprising processing circuitry and a memory. The memory contains instructions executable by the processing circuitry whereby the computing device is configured to identify a plurality of regions of a TVF. The TVF maps throughput values to packet values for a plurality of subflows. The computing device is further configured to periodically update a plurality of matrices comprising a matrix of resource sharing weights and a region determination matrix. The computing device is further configured to mark a packet with a packet value computed based on the plurality of matrices and the TVF (200), wherein the packet is received in one of the subflows.

In some embodiments, the computing device is further configured by the execution of the instructions to perform any one of the methods described above.

Other embodiments include a computer program comprising instructions which, when executed on processing circuitry of a computing device, cause the processing circuitry to carry out any one of the methods described above.

Other embodiments include a carrier containing said computer program. The carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a terminal 120, generally, as opposed to discussion of particular instances of computing devices 120a, 120b).

FIG. 8 is a pseudo-code snippet of an example algorithm for implementing aspects of the method of FIG. 7, according to one or more embodiments of the present disclosure.

FIG. 10 is a pseudo-code snippet of an example algorithm for implementing aspects of the method of FIG. 9, according to one or more embodiments of the present disclosure.

DETAILED DESCRIPTION

Figure 1:
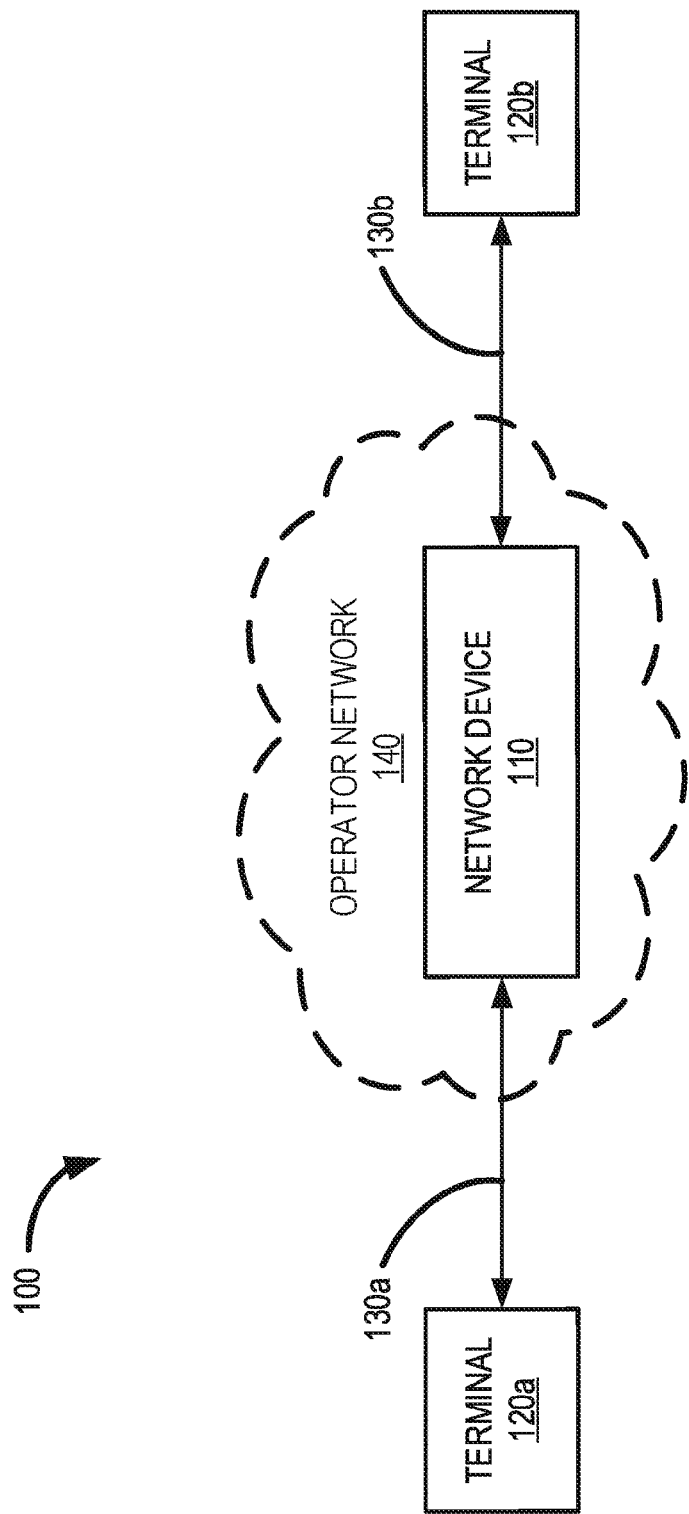
FIG. 1 is a schematic diagram illustrating an example network 100, according to one or more embodiments of the present disclosure.

FIG. 1 is a block diagram illustrating an example of a computer network 100. The network 100 comprises a plurality of computing devices. The computing devices comprise terminals 120a, 120b, and a network device 110 that is communicatively connected to the terminals 120a, 120b via respective physical connections 130a, 130b. The bandwidth available on connection 130a is a shared resource for the traffic aggregate of endpoint 120a. Similarly, the bandwidth available on connection 130b is a shared resource for the traffic aggregate of endpoint 120b.

It will be appreciated that although FIG. 1 depicts only a single network device 110 between the terminals 120a, 120b, other embodiments may include one or more other network devices that may be in parallel or in series between the terminals 120a, 120b. Thus, the network device 110 may be connected directly to either or both of the endpoints 120a, 120b, or may be indirectly connected to either or both of the endpoints 120a, 120b via one or more other network devices by other connections, depending on the particular embodiment. In some embodiments, any of the connections of the network 100 may be a leased transport that is shared.

In some embodiments, the network device 110 may be comprised in an operator network 140, and the terminals 120a, 120b may be subscribers in the operator network 140. In some embodiments, the network 100 comprises multiple operator networks, each comprising their own network devices via which the terminals 120a, 120b may exchange traffic. Further, although FIG. 1 only illustrates terminals 120a, 120b, other examples of the network 100 may comprise any number of terminals, any of number of which may be subscribers of one or more operator networks.

Figure 2:
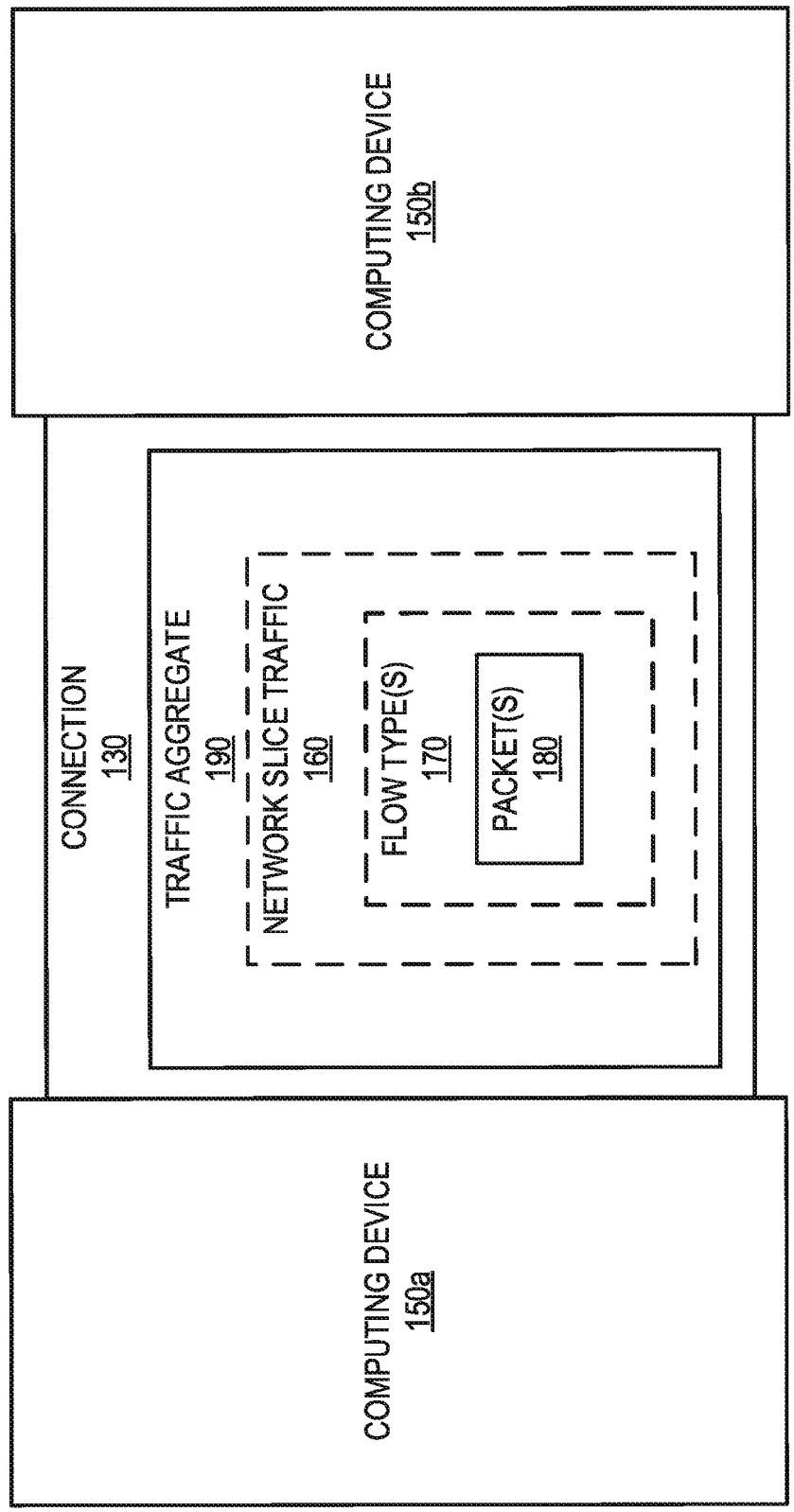
FIG. 2 is a schematic diagram illustrating an example connection between computing devices, according to one or more embodiments of the present disclosure.

FIG. 2 illustrates an example in which computing devices 150a, 150b are connected to each other via a connection 130. As previously noted, a computing device 150 may be a terminal 120 or a network device 110, and the traffic of each computing device 150 over the connection 130 is its traffic aggregate 190. The connection 130 may be a physical leased line that has been virtualized to carry the traffic associated with one or more network slices. Thus, the traffic aggregate 190 may comprise network slice traffic 160 for each of one or more traffic slices. The traffic aggregate 190 may additionally or alternatively comprise traffic belonging to one or more flow types 170. The flow types 170 may include, for example, flows/subflows having different priorities and/or flows/subflows supporting different services.

Each flow and/or subflow between the computing devices 150a, 150b comprises one or more packets 180. The packets 180 may be any of a variety of different types. Examples of the most common types of packets 180 include Internet Protocol (IP) packets (e.g., Transmission Control Protocol (TCP) packets), Multiprotocol Label Switching (MPLS) packets, and/or Ethernet packets. Among other things, the packets 180 may comprise one or more fields for storing values used by the network 100 in performing packet processing (e.g., deciding whether to forward, queue, or drop packets). These fields may be in either a header or payload section of the packet 180, as may be appropriate.

In some embodiments, the shared resources of the network 100 are managed using HQoS scheduling, which (as discussed above) is a technique that is known to provide significant advantages over legacy network resource management approaches. Notwithstanding these known advantages, embodiments of the present disclosure address one or more problems in managing shared resources using traditional HQoS scheduling.

For example, it has been observed when implementing conventional HQoS scheduling that computational complexity and memory demands will often grow as the number of traffic aggregates 190 in the network 100 increase. In particular, the number of levels in the hierarchy and the number of traffic aggregates 190 per level often grow significantly with increased numbers of traffic aggregates 190 in a traditional HQoS scheme. Further, configuration of an HQoS solution is often complex, burdensome, error-prone, and/or unwieldy. Indeed, traditional HQoS approaches often produce complex behaviors and can require configuration on a bottleneck-by-bottleneck basis.

Figure 3:
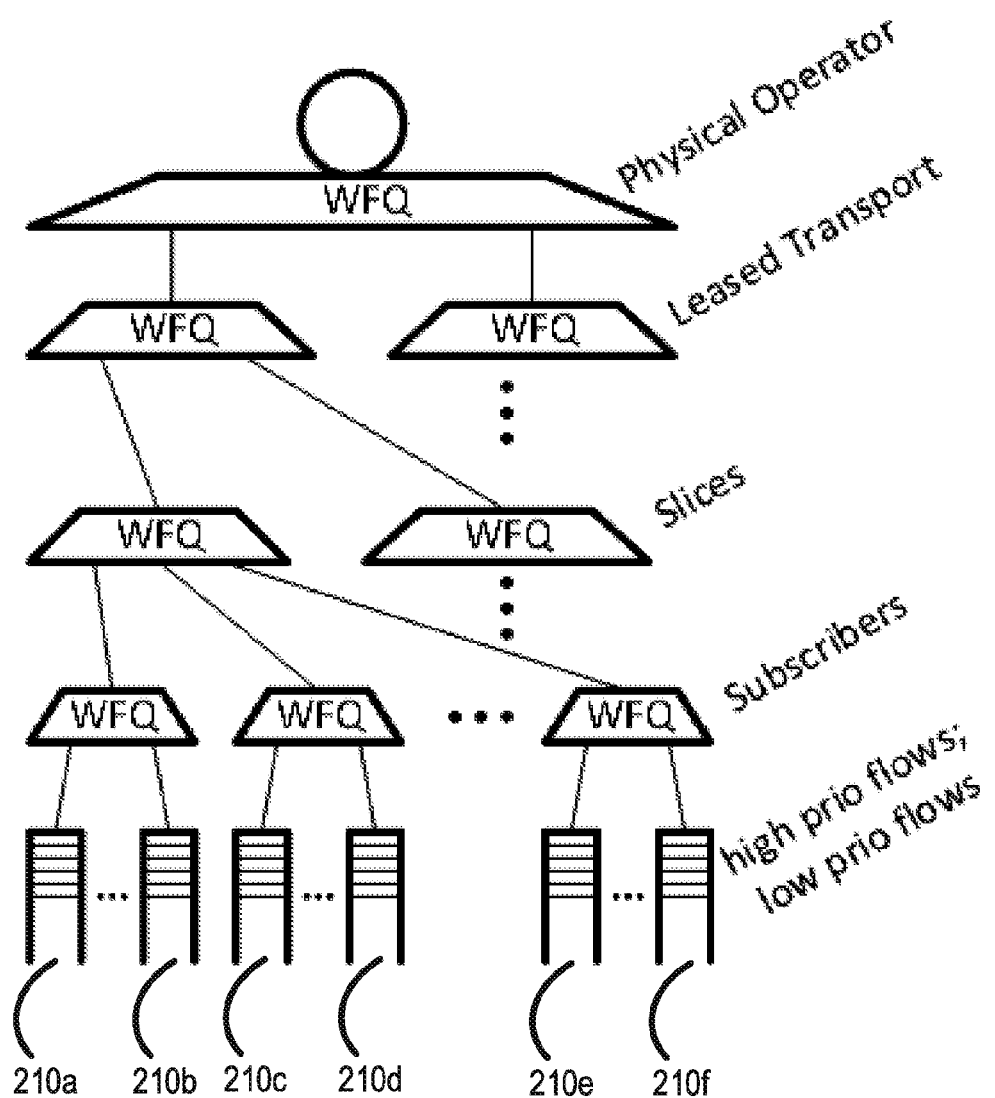
FIG. 3 is a schematic diagram illustrating an example HQoS by Scheduling architecture, according to one or more embodiments of the present disclosure.

FIG. 3 illustrates an example HQoS by Scheduling architecture from which such potential complexity may be recognized. As shown in FIG. 3, the HQoS by Scheduling architecture comprises a plurality of hierarchically organized layers. Each layer comprises one or more Weighted Fair Queues (WFQs) that define how much of the available shared resource is assigned to each class within the layer (or a portion thereof). In this example, there is a physical operator layer, a leased transport layer, a network slice layer, a subscriber layer, and a flow priority layer.

In the example of FIG. 3, resource sharing is defined between two operators, e.g., at a ratio of three-to-one, respectively. Under such a scheme, the traffic of Operator A would be assigned three times as many resources as the traffic of Operator B with which to share among its leased transports.

Each operator may have several leased transports that are assigned shares of the overall resources assigned to the operator. As shown in FIG. 3, the resource sharing among the transports may be defined by respective WFQs for the operators.

Further, as discussed above, a physical connection (e.g., a leased transport) may be virtualized to carry the traffic of a plurality of network slices. As shown in the example of FIG. 3, resource sharing among the network slices for each transport may be defined by an WFQ for each transport.

Also as discussed above, each network slice may serve a plurality of subscribers (or groups thereof). The resource sharing among classes of subscribers of each of the slices may be defined by an WFQ for each network slice, for example. Moreover, the resource sharing among the flows of each subscriber may be defined by a WFQ for each class of subscriber in order to allocate different amounts of resource to flows of different types (e.g., to provide more resources to high priority flows relative to low priority flows). For example, a gold class of subscribers may be given a greater share of the shared resources than a silver class of subscribers, and streaming traffic may be given a greater share of the shared resources than web traffic.

Any of the WFQs may apportion the shared resources in any manner that may be deemed appropriate. For example, while the resources were discussed above as being shared between two operators at a ratio of three-to-one, one of the operators may operate two network slices, and the HQoS resource sharing scheme may define resource sharing between those two slices evenly (i.e., at a ratio of one-to-one). Subsequent WFQs may then further apportion the shared resources. For example, the HQoS resource sharing scheme may define resource sharing for both gold and silver subscribers at a ratio of two-to-one, respectively. Further still, the HQoS resource sharing scheme may define resource sharing for web flows and download flows at a ratio of two-to-one. Thus, each WFQ may be designed to make a suitable apportionment of the shared resources as may be appropriate at its respective level of the hierarchy.

Given all of the above, each packet 180 using a shared resource of any of the operators may be scheduled according to one of a plurality of packet queues 210a-f based on the balance of shared resources defined by the entire relevant portion of the hierarchy of WFQs. As can be seen from this example, the deeper and wider the hierarchy, the more WFQs are required, each of which may impose its own computational cost.

Orthogonal to resource sharing, traffic aggregates may have different preferred delay and jitter, thereby adding further complexity to the problem of readily providing a defined HQoS resource sharing scheme.

Further still, as networks evolve, bottlenecks may shift to different locations in the network. Although last hops currently predominate the bottlenecks of most networks, in future networks these bottlenecks could shift to more centralized network devices instead, particularly given the increases in speed at last hops in modern 5G radio networks and fiberoptic networks to the home. Further, the traffic at these bottlenecks is heterogeneous, when it comes to certain congestion control that may be used (e.g., imposing RTT requirements). The traffic mix is also continuously changing.

Embodiments of the present disclosure facilitate control over resource sharing such that user Quality of Experience (QoE) can be more readily managed and effectively improved. According to embodiments, a computing device 150 in the network 100 has an understanding of the resource sharing weights to be applied to packet flows in accordance with the desired overall HQoS policy, and marks packets 180 with a packet value accordingly.

The packet value is a value that indicates a classification of the packet 180. For example, the packet value of a packet 180 may indicate a drop precedence of the packet 180. In one particular embodiment, a packet 300 with a relatively lower packet value will be treated as having a higher drop precedence and will tend to be dropped by the network more frequently than a packet 180 having a relatively higher packet value. Alternatively, other embodiments may use a relatively low packet value to indicate a relatively low drop precedence.

According to particular examples, the computing device 150 may comprise a Core Stateless Active Queue Management (CSAQM) network device 110 (e.g., a router) that manages resource sharing for at least some of the network 100. In this regard, the computing device 150 may be located at any appropriate location in the network 100. In one particular example, the computing device 150 may mark packets 180 on a domain border, at an access point, and/or at a gateway of the network 100.

The computing device 150 may additionally schedule the marked packets for transmission based on the packet value that marks each packet. In particular, one or more embodiments provide weighted fairness among several subflows through use of one or more mechanisms that are computationally simple relative to known alternatives, thereby enabling relatively quick scheduling of even highly complex HQoS policy.

Figure 4:
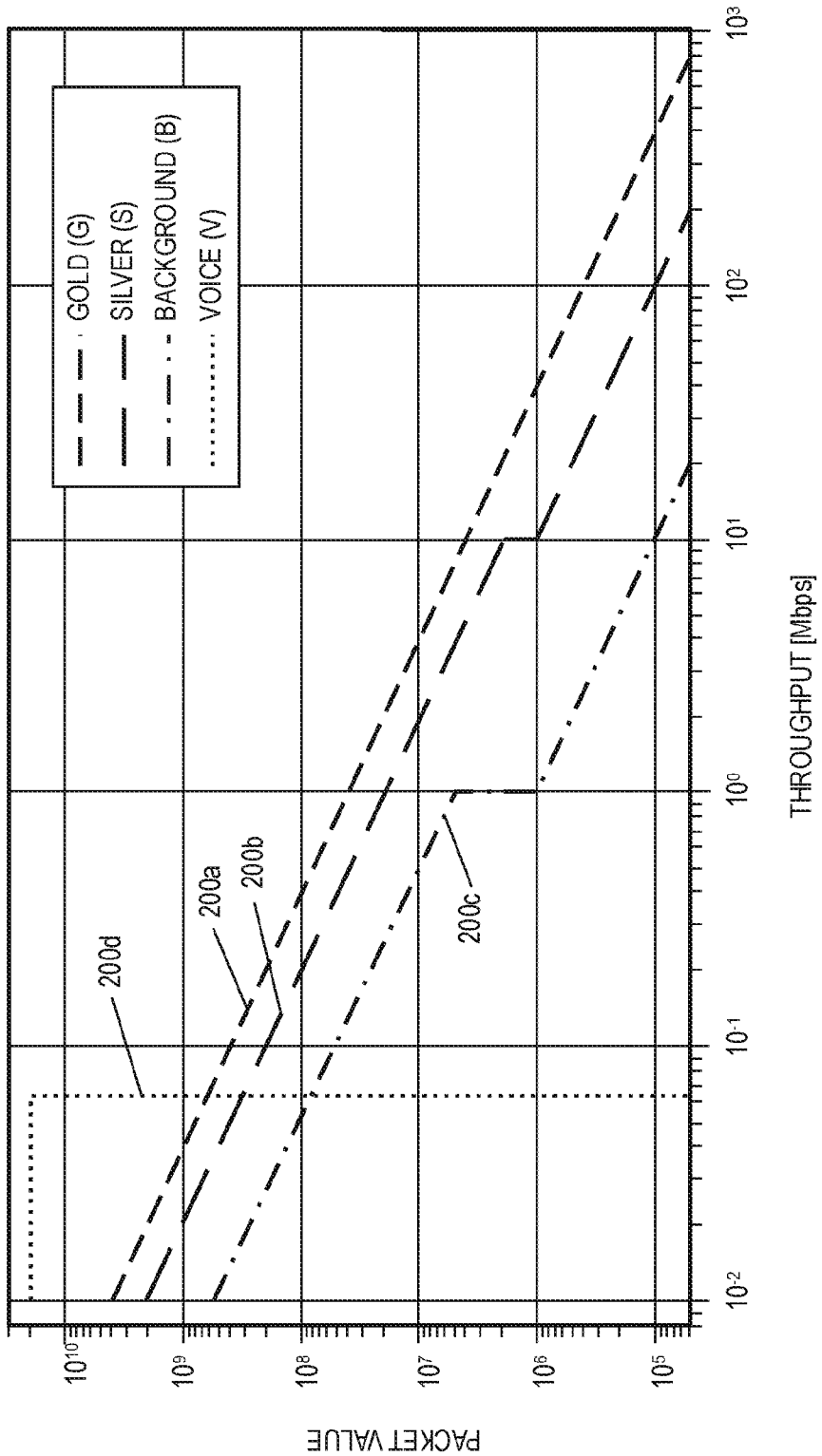
FIG. 4 is a graph illustrating examples of Throughput-Value Functions (TVFs), according to one or more embodiments of the present disclosure.

In general, embodiments of the computing device 150 mark packets 180 in accordance with a Throughput-Value Function (TVF). A TVF is used to match a throughput value to a packet value. The packet value is then used to mark a packet 180. The TVF may, for example, define packet values for a subflow or type thereof. In the example of FIG. 4, TVFs 200a-d define packet values for gold, silver, background, and voice subflow types, respectively, across a range of throughput values.

In contrast to more conventional approaches that use a complex hierarchy of WFQ queues to determines packet values at expensive per-packet computational cost, embodiments of the present disclosure are able to efficiently implement HQoS that enforces weighted fairness among any number of subflows (or groups thereof) with relatively simple per-packet behaviors.

Examples of particular embodiments will now be discussed in terms of subflows. However, it should be appreciated that embodiments may similarly be applied with respect to, for example, groups of subflows, flows, and/or traffic aggregates. Indeed, a TVF 200 may be applied to classifications of traffic at any level of granularity, depending on the embodiment.

In addition, in order to succinctly describe the relationship between certain values used in the processing of particular embodiments, the following definitions are used throughout this disclosure (the nature of which will become more clear below):

n—number of subflows
    l—subflow index
    i—counter index
    j—TVF region index
    r—random number in the region $[0, S_l]$, randomly selected in order to determine a packet value with which to mark a packet in subflow l
    $r_{tr}$—transformation of r, used as an input to a TVF 200 in order to obtain a packet value with which to mark packets and achieve resource sharing fairness As used herein, the term "vector" refers to a list of values, e.g., as distinguished from a matrix as defined below. Throughout this disclosure, the following definitions are used to refer to particular vectors, each of which has as many elements as there are subflows (i.e., n elements):

S—rate measurement vector (periodically updated), where $S_l$ is the measured throughput of subflow l
    w—weight vector, where of $w_l$ is the weight of subflow l
    o—index reordering vector, in which for increasing values of i, $o_i$ is the index l of a subflow having an increased rate-to-weight ratio ($S_l/w_l$)
    B—region limit vector, where $B_j$ is the upper throughput boundary of region j and the lower throughput boundary of region j+1

δ—region width vector, where $\delta_j$ is the width of region j

As used herein, the term "matrix" refers to an arrangement of values in a grid having multiple rows and multiple columns. Throughout this disclosure, the following definitions are used to refer to certain matrices:

W—normalized weight matrix, wherein $W_{j,i}$ refers to the normalized weight of subflow $o_i$ in region j R—region determination matrix, wherein $R_{j,i}$ indicates when region j is used for subflow $o_i$.

Figure 5:
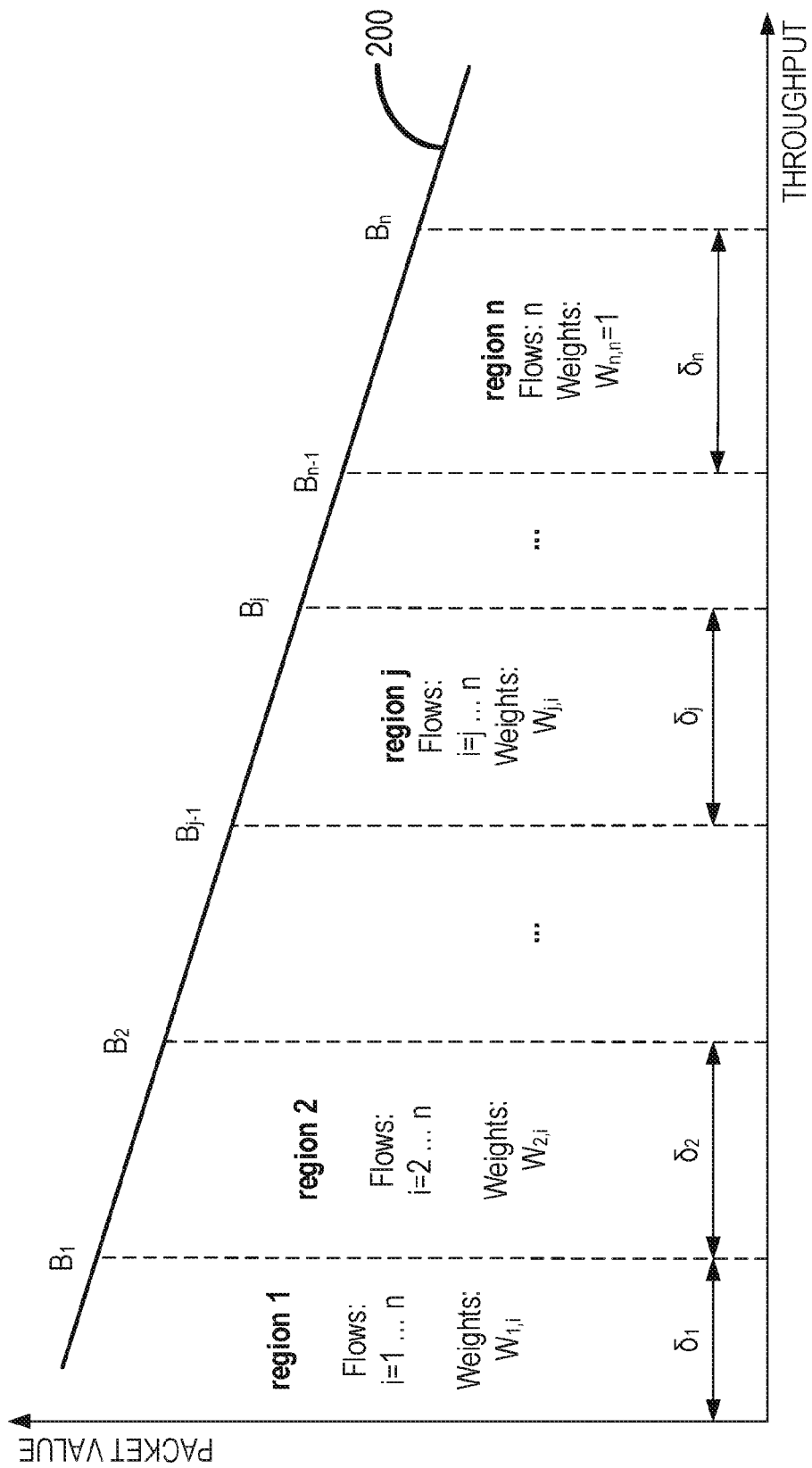
FIG. 5 is a graph illustrating example regions of a TVF, according to one or more embodiments of the present disclosure.

In order to represent the TVF 200 in a way that can be more readily applied on a per-packet basis, the TVF 200 is divided into regions as shown in FIG. 5. In particular, the TVF 200 is divided into n regions, where n is the number of subflows. Each successive region represents a decreasing number of subflows. Thus, the TVF 200 in the first region represents n subflows, and each subsequent region represents one fewer subflow than the previous region. Accordingly, the second region represents n−1 subflows, the third region represents n−2 subflows, and so on. The last region (i.e., n-th region) represents a single subflow.

Moreover, subflows having higher indices are represented in a larger number of regions. Correspondingly, subflows with lower indices are represented in a smaller number of regions. Region 1, for example, represents subflows one through n. In contrast, region n represents subflow n only.

Which subflows are represented by which regions may change depending on the measured throughputs and weights of the subflows. A particular approach to determining which subflows are represented by which regions is depicted in FIGS. 6A-6C.

Figure 6A:
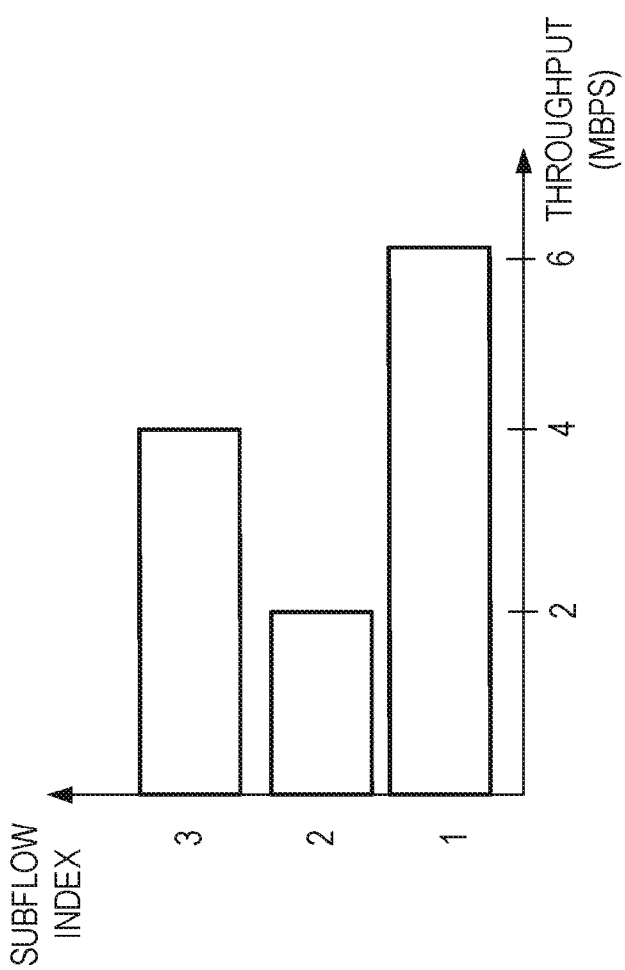
FIG. 6A is a graph and corresponding data table illustrating attributes of a plurality of subflows, according to one or more embodiments of the present disclosure.
Figure 6B:
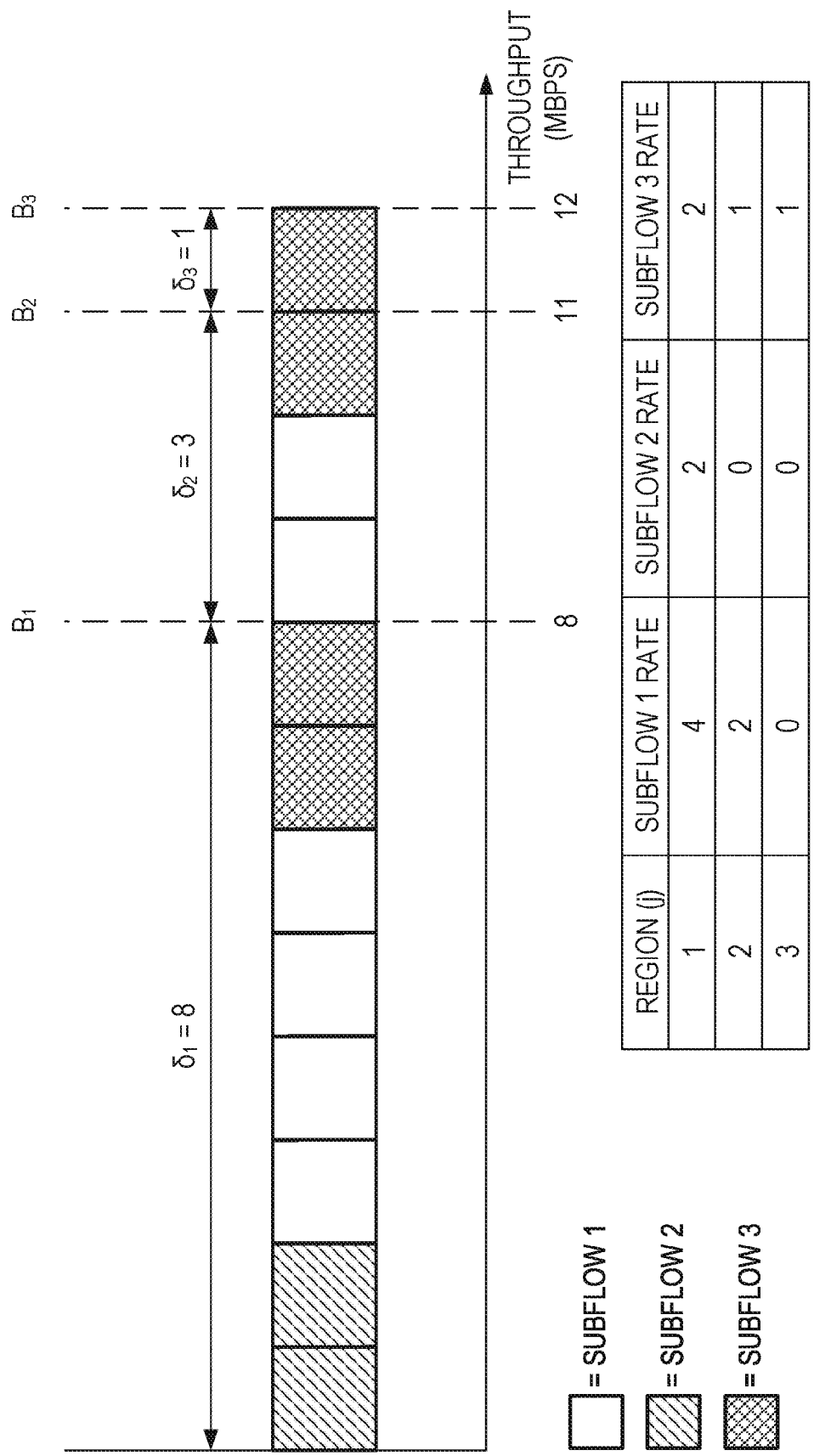
FIG. 6B is a graph and corresponding data table illustrating TVF region determination, according to one or more embodiments of the present disclosure.
Figure 6C:
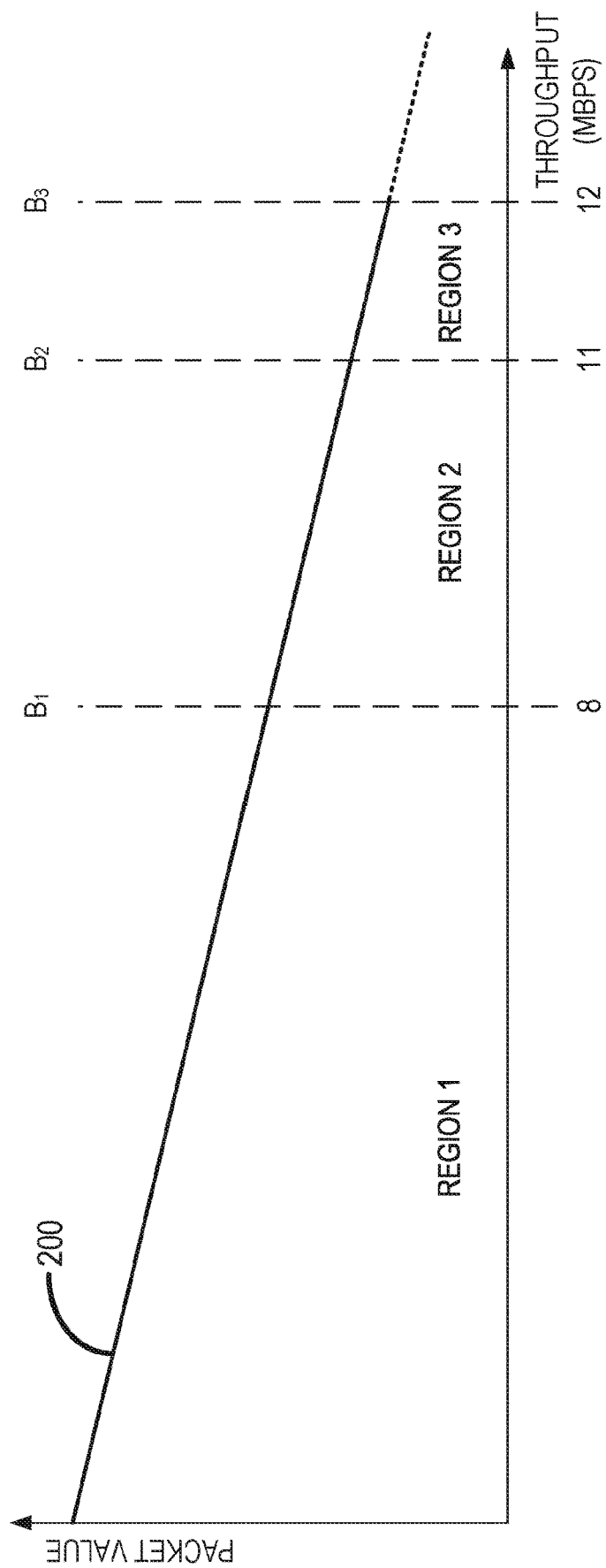
FIG. 6C is a graph illustrating the determined regions with respect to the TVF, according to one or more embodiments of the present disclosure.

FIG. 6A illustrates the current throughput rate of three example subflows. As discussed above, a computing device 150 may comprise a CSAQM packet marker that assigns a packet value to the packets of each subflow based on a TVF 200 and the current rate of the subflow of the packet being marked. In this example, the measured rates of subflows 1, 2, and 3 are 6, 2, and 4 Mbps, respectively. The measured rates may be represented by a vector, S, that stores the subflow rates in subflow index order, for example.

In a more limited approach, a random number between 0 and the measured rate of a subflow may be chosen as an input to the TVF 200 in order to obtain an appropriate packet value for a packet of that subflow. However, it has been observed that this approach may be limited in effectiveness. For example, such may only be suitable for determining packet values for a single subflow.

In contrast to these more limited approaches, one or more embodiments of the present disclosure mark aggregated traffic of several subflows such that the subflows shall fairly share the resources of the overall traffic aggregate according to a weighted fair sharing scheme. Embodiments of the present disclosure may determine the packet value for all packets of each subflow with as few as a single TVF 200, yet continue to maintain fairness of the sharing scheme between the subflows. That said, other embodiments may include additional TVFs as desired, but may advantageously not be required.

For example, a household may have video streaming, online gaming, and simple web browsing subflows. The weight of each of these subflow types may be configured such that the video streaming receives more resources than the other subflows. In the example of FIG. 6A, the weights of the three subflows are 2, 1, and 1, respectively. These weights may be configured as part of the resource sharing policy of the network. Accordingly, these weights may be changed when the network implements new resource sharing policies. That said, these weights are expected to generally change infrequently, if at all. The weights may be represented by a vector, w, that stores the weights in subflow index order, for example.

The subflows may be ranked based on the resources they use (i.e., their measured rates) relative to their weighted share. This can be calculated by dividing the rate of each subflow by its normalized weight. When the rates of the subflows are weighted according to the number of shares they each have in this way, the weighted throughputs of the example three subflows are 12, 8, and 16, respectively. That is, the weighted rate of subflow 1 is given by 6/0.5=12; the weighted rate of subflow 2 is given by 2/0.25=8; and the weighted rate of subflow 3 is given by 4/0.25=16.

Subflow 2 uses the least amount of resources as compared to its relative share of the resources, as indicated by subflow 2 having the smallest weighted rate. In contrast, subflow 3 uses the greatest amount of resources as compared to its relative share of the resources, having a weighted rate of 16. Subflow 1 uses resources relative to its share of the resources at a ratio that is between that of subflows 2 and subflow 3, having a weighted rate of 12. Accordingly, FIG. 6A shows the utilization ranks of the three subflows as 2, 1, and 3, respectively. The utilization rankings may be represented by a vector, o, that stores the indices of the subflows in ranked order.

Given that the current overall rate is 12 Mbps (i.e., 6+2+4) and the weights of the three subflows being 2, 1, and 1, respectively, the three subflows would ideally share the overall 12 Mbps rate by utilizing 6, 3, and 3 Mbps, respectively. From FIG. 6A, it is apparent that resource sharing can be improved (e.g., with respect to subflows 2 and 3). This improvement may be effectuated by appropriate packet marking so that packets may be transmitted in greater accord with the resource sharing weights.

To calculate the packet value, throughput ranges that define regions of the TVF 200 are determined. In particular, the TVF 200 is divided into as many regions as there are subflows. As there are there are three subflows in the example of FIG. 6A, three regions will be determined.

FIG. 6B illustrates an example of how the regions are determined. According to this example, the first region is defined as being wide enough to cover the entire rate of the subflow having the smallest rank (in this example subflow 2), as well as proportional amounts of the other subflows (i.e., subflows 1 and 3), taking into account their fair shares. In this example, the smallest ranked subflow 2 has a rate of 2 Mbps. For every 2 Mbps of subflow 2, subflow 1 is given twice as many resources (because the relative weight of subflow 1 to subflow 2 is two-to-one). Therefore, in addition to the 2 Mbps of subflow 2, the first region will also accommodate 4 Mbps of subflow 1. Finally, subflow 3 has a rate of 2Mpbs at a one-to-one ratio with subflow 2, so the first region will further accommodate 2 Mbps of subflow 3, for a total width, δ, of 8 Mbps for the first region (i.e., $\delta_1$=8). Because the first region starts at zero, the upper boundary, B, of the first region is 8 (i.e., $B_1$=8).

Notably, the packets of subflow 2 will be marked with packet values exclusively from the first region of the TVF 200. As will be explained in further detail below, if the TVF 200 of FIG. 5 were used (for example), the subflow that is acting most responsibly given its share of resources will be marked with generally high packet values.

The second region is then determined based on the second smallest ranked subflow 210a. The width of the second region $\delta_2$ will accommodate the entire bandwidth of subflow 210a not already accounted for by the first region (i.e., 2 Mbps), as well as a proportional share of subflow 210c (i.e., 1 Mbps, given that subflow 210*a* has weight that is two-to-one relative to that of subflow 210*c*). Therefore, the width of the second region is 3 (i.e., $\delta_2=3$). Given that the upper boundary of the first region is 8 and a width of the second region being 3, the upper boundary of the second region is 11. That is, $B_2=B_1+\delta_2$, which in this example is 11=8+3.

The third (and final) region is then determined based on the third smallest ranked subflow 210*c*. The width of the third region 63 will accommodate the entire bandwidth of subflow 210*c* not already accounted for by previous regions (i.e., 1 Mbps). Because all other subflows have been entirely represented by previous regions, no proportional shares of other subflows 210*a*, 210*b* need to be considered in the final region. Therefore, the width of the third region is 1 (i.e., $\delta_3=1$). Given that the upper boundary of the second region is 11 and the width of the third region is 1, the upper boundary of the third region is 12. That is, $B_3=B_2+\delta_3$, which in this example is 12=11+1.

Each subflow 210*a-c* may be marked with packet values from any of the regions of the TVF 200 in which it is represented. FIG. 6C illustrates the three regions determined in the example of FIG. 6B as applied to an example TVF 200.

In order to determine a particular packet value with which to mark packets, a throughput value that can be used as input to the TVF 200 is determined. The throughput value that acts as an input to the TVF will be between zero and the total throughput of the flows.

According to particular embodiments, the input throughput value to the TVF 200 is determined by transformation of a randomly selected number. The randomly selected number is a number between zero and the subflow's throughput. Thus, for a packet of subflow 1, the random number would be between zero and six.

A region of the TVF is then chosen to represent the random throughput value based on how much throughput of the subflow is represented in the regions. Further, based on the weight of the subflow in the given region, and the throughput already represented in the previous regions, it is determined how far into the given region the random throughput value will be transformed.

Figure 7:
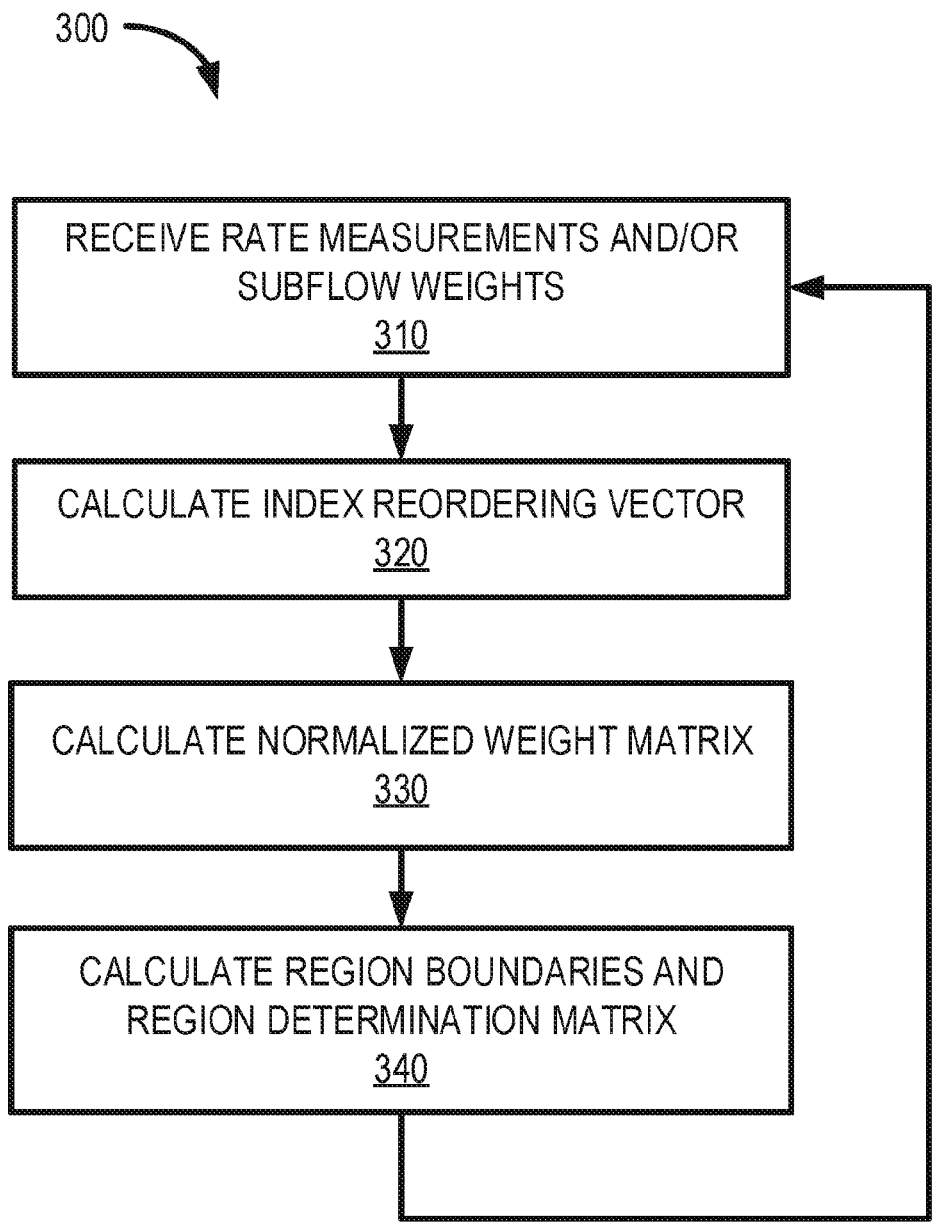
FIG. 7 is a flow diagram illustrating an example method implemented by a computing device, according to one or more embodiments of the present disclosure.
Figure 9:
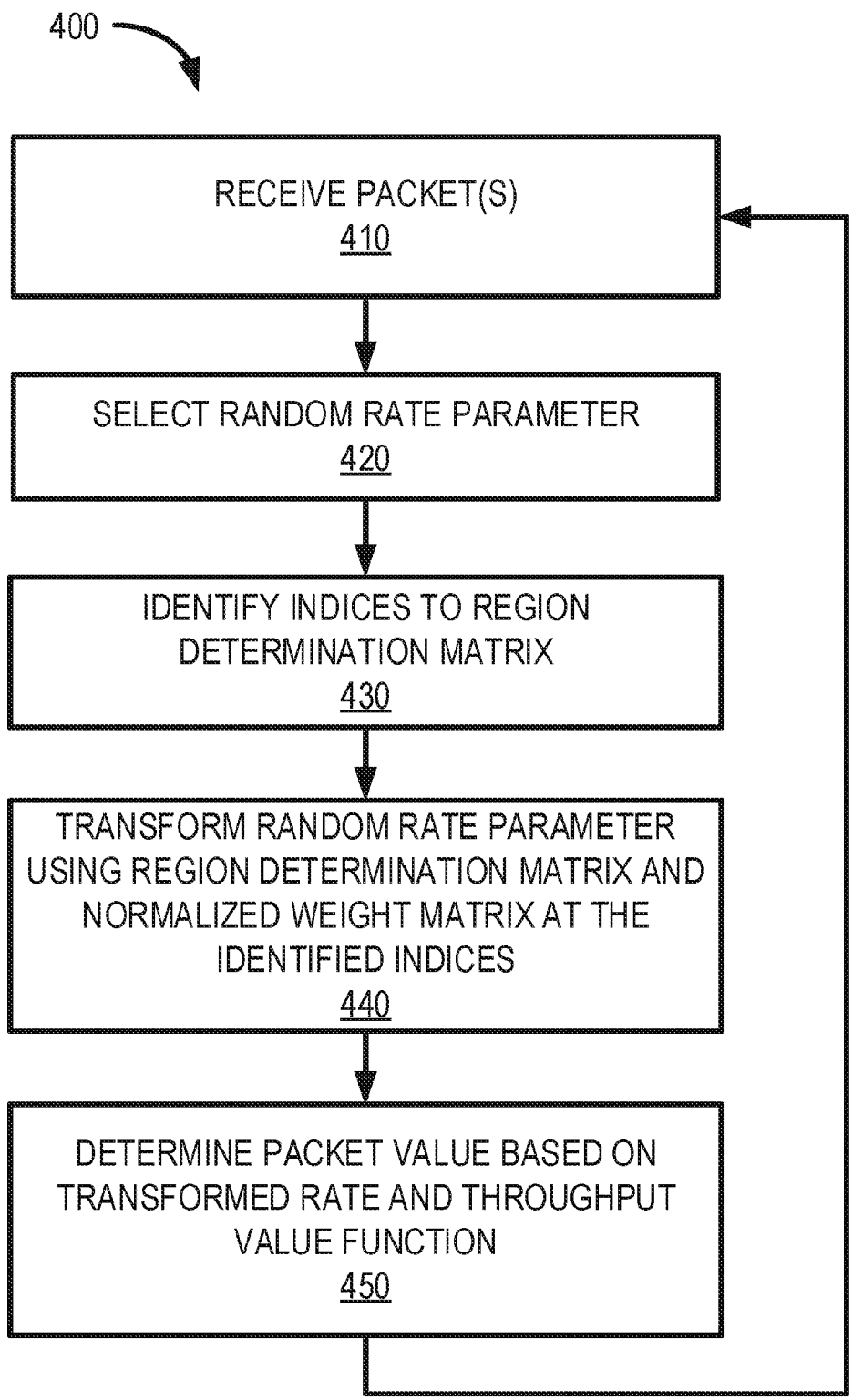
FIG. 9 is a flow diagram illustrating another example method implemented by a computing device, according to one or more embodiments of the present disclosure.

Overly frequent recalculation of some or all of the above-discussed TVF region information may, in some situations, be computationally burdensome. In order to provide efficient and scalable processing, one or more embodiments of the present disclosure include a method 300 of periodically updating TVF region information (e.g., as illustrated in FIG. 7). One or more embodiments of the present disclosure additionally or alternatively include a method 400 of marking packets (e.g., as illustrated in FIG. 9) based on periodically updated TVF region information. The method 300 may be performed periodically, whereas the method 400 may be performed on a per-packet basis. In some embodiments, the methods 300, 400 run on separate processing units of the computing device 150, e.g., so that the periodic computations of method 300 do not delay the per-packet operations of method 400.

As the method 400 of particular embodiments may rely on values that are calculated by the method 300, embodiments of the method 300 will be explained first with reference to FIG. 7. As noted above, the method 300 may be performed periodically, e.g., every 5 ms.

The method 300 comprises receiving a plurality of rate measurements and/or subflow weights (block 310). As described above, the weight vector w is a configured set of values that represents the relative share of resources allocated to the subflows. Although the weight vector can be configured, it is expected that once w is configured, these resource sharing weights are further updated infrequently, if at all. In contrast, the rate measurement vector S represents the measured throughput of the subflows and changes far more frequently. Accordingly, most embodiments will receive new rate measurements for the subflows as frequently as each period.

One or more embodiments of method 300 further comprise calculating an index reordering vector, o (block 320). In this example, the index reordering vector, o, stores the values of subflow indices in ascending order of rate-to-weight ratio (e.g., to represent the utilization ranking of the subflows discussed above). However, it will be appreciated that, in some alternative embodiments, the values of the indices may be stored in descending order instead, with appropriate adjustments to computations, vectors, and matrices described herein correspondingly made as necessary.

The index reordering vector may be used in a variety of ways. For example, given that the measured rates and/or weights of the subflows may change, the values of the index reordering vector, o, based on a rate-to-weight ratio may be calculated responsive to receiving new rates and/or weights. Maintaining the indices of the subflows in rate-to-weight ratio ranked order may enable the computing device 150 to iterate through the subflows in that same order, e.g., when populating and/or referencing the normalized weight matrix, W, and/or the region determination matrix, R.

Particular embodiments of the present disclosure periodically update a vector of subflow indices, o, based on rate-to-weight ratios, such that $o_1, \ldots, o_n$ satisfies:

$$\frac{S_{o_i}}{W_{o_i}} \leq \frac{S_{o_j}}{W_{o_j}}, (i < j) \forall\, i, j \in [0, n]$$

One or more embodiments of the method 300 further comprise calculating a normalized weight matrix (block 330). That is, the vector of subflow indices, o, may be used to calculate the weights of the subflows in a manner that is normalized per region, and stored in matrix W. As will be discussed further below, the normalized weight matrix may be used in determining a transformed rate that is suitable as an input to the TVF 200.

To normalize the weights of the subflows of each region, the weight of each subflow in the region may be divided by the sum of all the weights of the subflows in the region. In this way, the relative share of each subflow per region may be determined and stored.

Having determined the normalized weights of the regions, one or more embodiments of the method 300 further comprise using this information to calculate the boundaries, B, of the regions of the TVF 200 and a corresponding region determination matrix, R (block 340). According to such embodiments, the regions of the TVF 200 may have varying sizes and applicability to packet marking depending on the rates of the subflows and the normalized weights discussed above.

Accordingly, embodiments of the present disclosure include determining a width $\delta$ of each region j, which may be used to determine the upper throughput boundary of region j (i.e., $B_j$) given the upper throughput boundary of the previous region (i.e., $B_{j-1}$). As noted above, the lower throughput boundary of the first region is zero. A region determination matrix R may then be calculated, the values of which control which region's relative weights will be a basis for determining a packet value of one or more received packets. For example, the value of region determination matrix $R_{j,i}$ may be used to determine when the j region is used for the subflow indicated by $o_i$.

FIG. 8 is a pseudo-code fragment illustrating an example of code for implementing the method 300 according to particular embodiments and consistent with the description above with respect to FIG. 7.

FIG. 9 is a flow diagram illustrating an example of the method 400. As mentioned above, the method 400 may be performed on a per-packet basis in order to determine an input to the TVF 200 that will provide a packet value with which to mark each received packet. The method 400 may use values determined by the method 300, which may be executing in parallel with the method 400.

For example, one or more embodiments of the method 400 comprise receiving one or more packets (block 410). Each of the received packets is comprised in a corresponding one of the n subflows.

One or more embodiments of the method 400 further comprise selecting a random rate parameter (block 420). The random rate parameter may, for example, be a random number between zero and the measured throughput of the subflow of the packet to be marked.

One or more embodiments of the method 400 further comprise identifying indices to the region determination matrix R (block 430). For example, indices i and j may be determined to obtain value $R_{j,i}$ from the matrix R. In this regard, i may be identified such that $o_i$ provides an index of the subflow. Additionally or alternatively, j may be identified based on the region determination matrix and the random rate parameter. In particular, j may be identified based on the values of i in the region determination matrix, such that $R_{j-1,i}$ is less than the random rate parameter, and $R_{j,i}$ is equal to or greater than the random rate parameter. That is, the index j used in the method 400 may be selected as the index j of the region that includes the random rate parameter within its width for the subflow of the packet.

One or more embodiments of the method 400 further comprise transforming the random rate parameter using the region determination matrix at the identified indices. For example, as discussed above, each region of the TVF 200 may represent multiple subflows, and one or more of the subflows may be represented in a plurality of the regions. The region determination matrix R may be used to determine which region representing the subflow of the packet (and which values associated therewith) to use for determining a transformed rate rtr that produces fair packet values when used as input to the TVF 200.

In one particular example, the value of the matrix for the region previous to j (i.e., j−1) and subflow of the packet i is subtracted j−1 is subtracted from the random rate parameter. The difference essentially represents how far into the j region the random rate parameter is. This difference may be added to the lower boundary of that j−1 region (i.e., which is the value of the vector $R_{j-1}$). The ratio of the resulting rate relative to the weight in the normalized weight matrix at those same indices j and i may then be used as a transformed rate $r_{tr}$ that produces fair packet values when used as input to the TVF 200. That is, the transformed rate $r_{tr}$ may be set according to the equation:

$$r_{tr} = B_{j-1} + (r - R_{j-1,i})/W_{j,i}$$

Having determined a transformed rate $r_{tr}$, the transformed rate may be used as an input to the TVF 200 to determine a packet value with which to mark the packet (block 450). That is, a transformed rate based on some randomization and the normalized weights of the subflows may be used as an input to the TVF 200 that generates packet values that produces fair resource sharing results.

FIG. 10 is a pseudo-code fragment illustrating an example of code for implementing the method 400 according to particular embodiments and consistent with the description above with respect to FIG. 9. The example pseudo-code fragment of FIG. 10 accepts a subflow index of the packet to be marked, and a random rate parameter, and outputs a transformed rate rtr that may be used to determine a suitable packet value.

Testing was performed to obtain transformed rates using an embodiment of the methods 300, 400 discussed above. The test involved the packets of five subflows. The subflows had throughput rates such that S=[1000, 1500, 2000, 500, 10000] and a weight vector such that w=[3, 1, 1, 3, 2]. Accordingly, an index reordering vector was determined for S and w such that o=[4, 1, 2, 3, 5]. For example, the index 4 is first in vector o because 500/3 (the value of $S_4/w_4$) produces the lowest ratio of S/w among the subflows.

Figure 11:
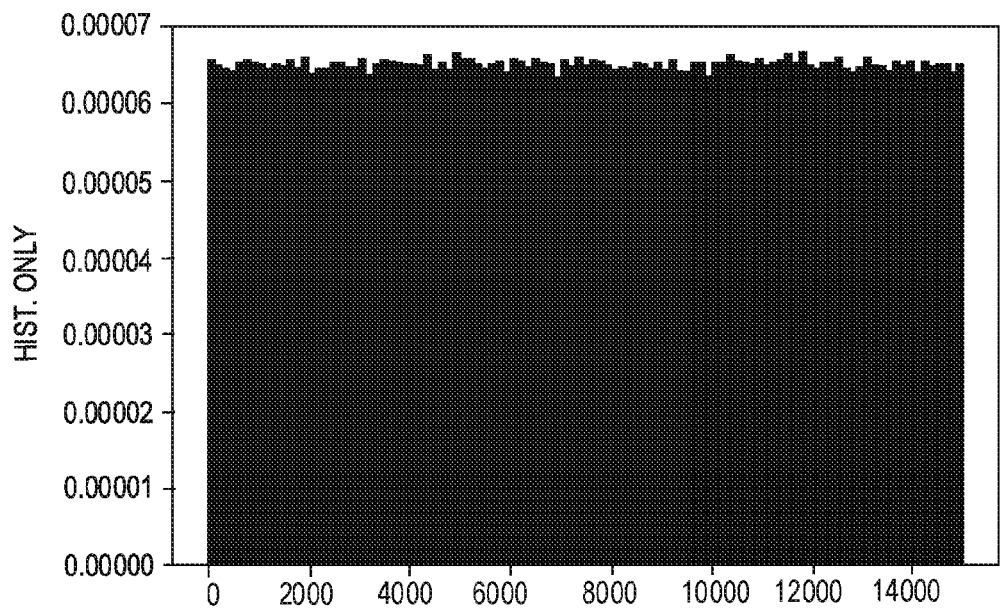
FIGS. 11-15 are histograms illustrating resulting packet values obtained by testing an embodiment of the present disclosure.

FIG. 11 is a histogram of the resulting transformed rates produced by the tested embodiment for packets of all subflows. As can be seen from FIG. 11, a generally even distribution of transformed rates is produced. Thus, the tested embodiment has been observed to produce inputs to the TVF 200 that produce a high variety of packet values without disproportionate reuse thereof.

Figure 12:
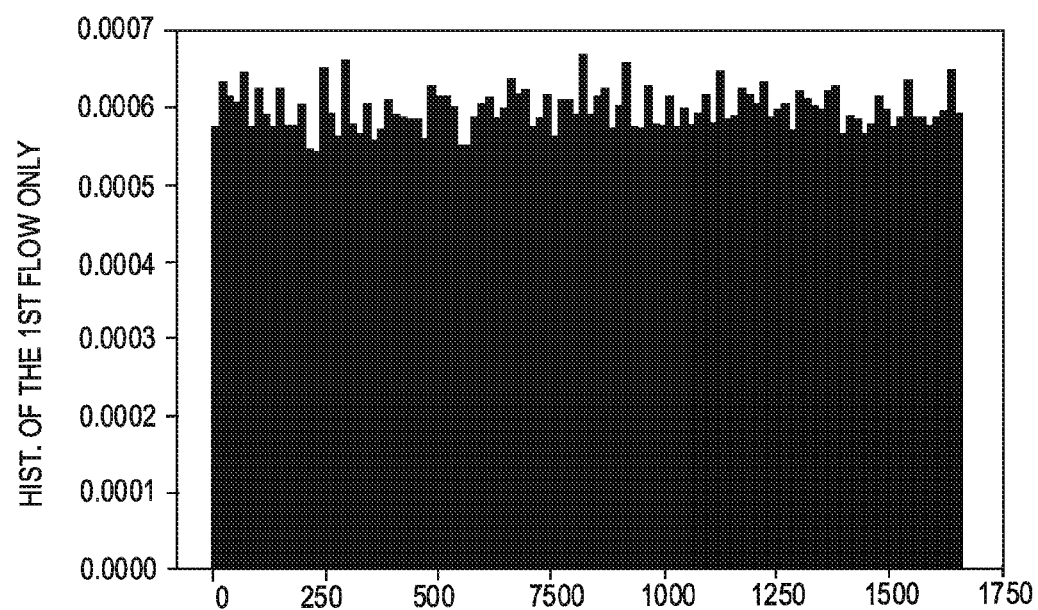

FIG. 12 is a histogram of the transformed rates produced by the tested embodiment for packets of only the first subflow. As discussed above, subflows having lower indices may be represented in fewer regions. In this example, the first subflow is represented only in one region. Accordingly, the histogram of the transformed rates from zero to $B_1$ are fairly even throughout the first region.

Figure 13:
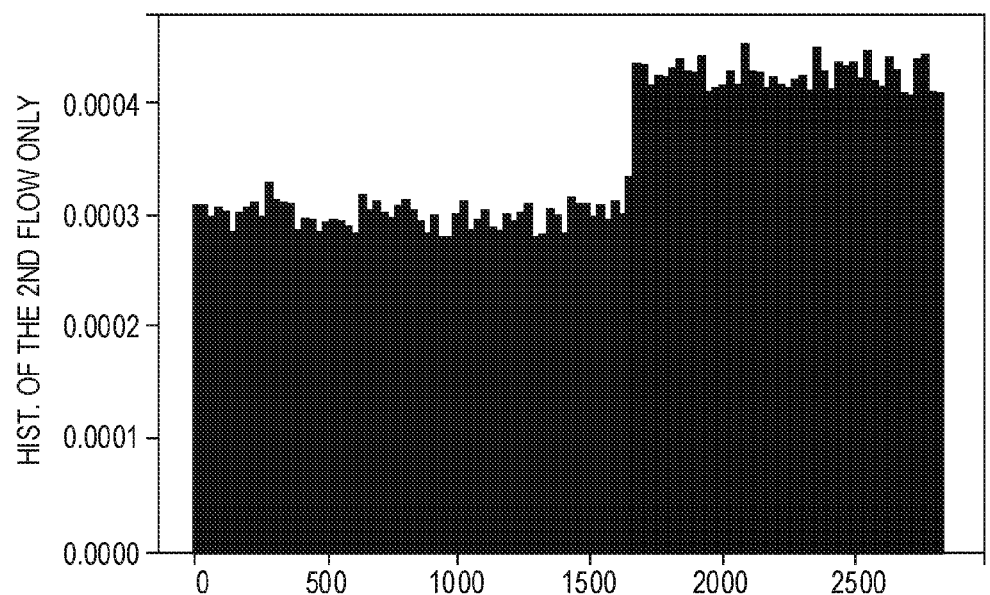

FIG. 13 is a histogram of the transformed rates produced by the tested embodiment for packets of only the second subflow. From the histogram of FIG. 13, it can be seen that, for the second subflow (which is represented in two regions), transformed rates in the first region are obtained less frequently per value than the transformed rates in the second region. However, in general, the frequency of the transformed rates within each region are generally even.

Figure 14:
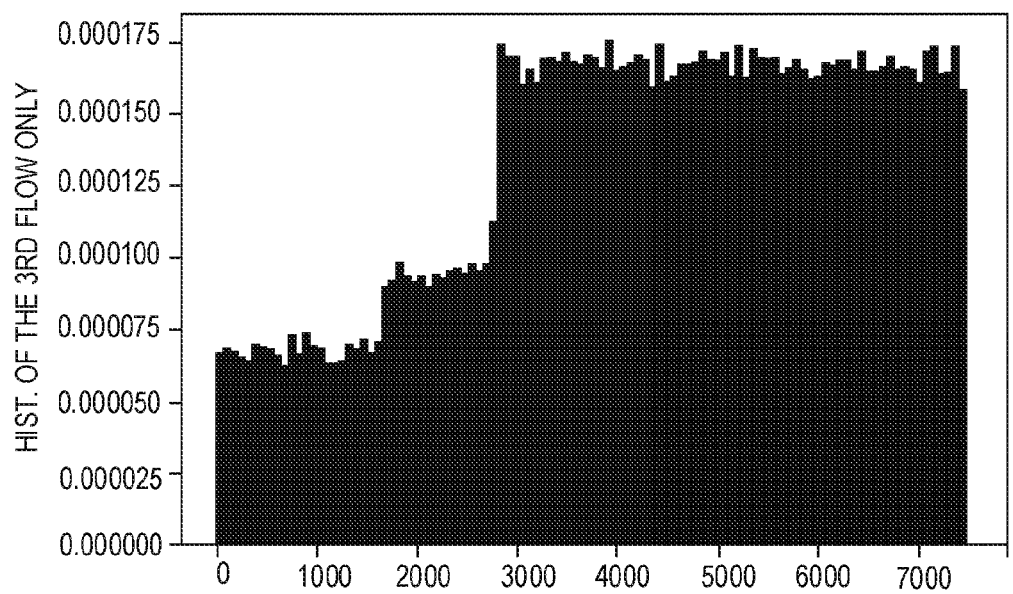

FIG. 14 is a histogram of the transformed rates produced by the tested embodiment for packets of only the third subflow. The histogram of FIG. 14 reveals three distinct plateaus of values corresponding to the representation of the third subflow in three regions.

Figure 15:
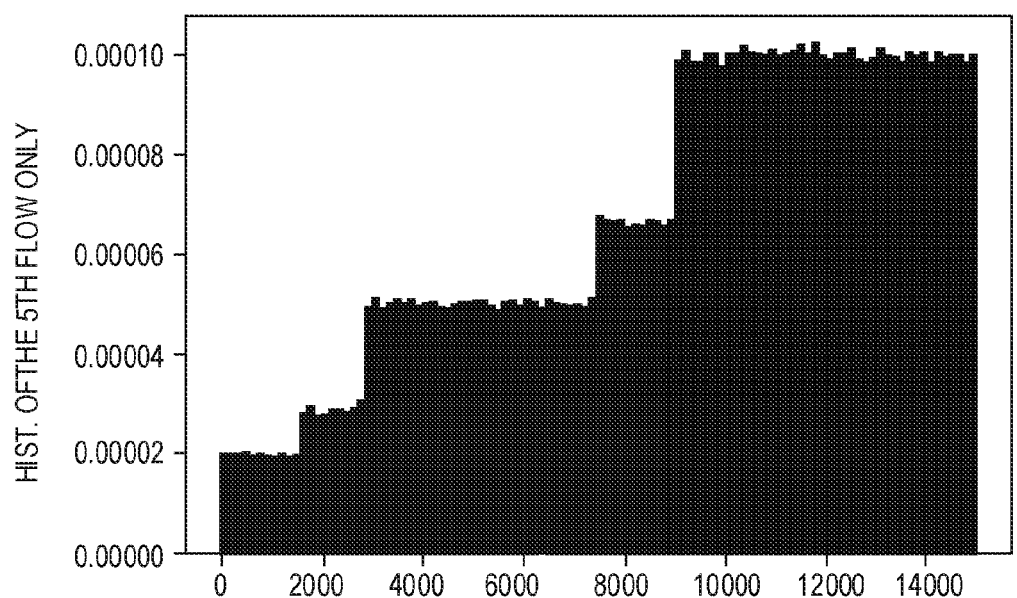

FIG. 15 is a histogram of the transformed rates produced by the tested embodiment for packets of only the fifth subflow, which has five plateaus corresponding to the five regions in which the fifth subflow is represented. Combining the histograms of each of the subflows one through five gives the histogram of FIG. 11, with less frequent transformed rates per subflow accumulating to overall frequency that is on par with transformed rates in higher regions but applicable to packets of fewer subflows.

Figure 16:
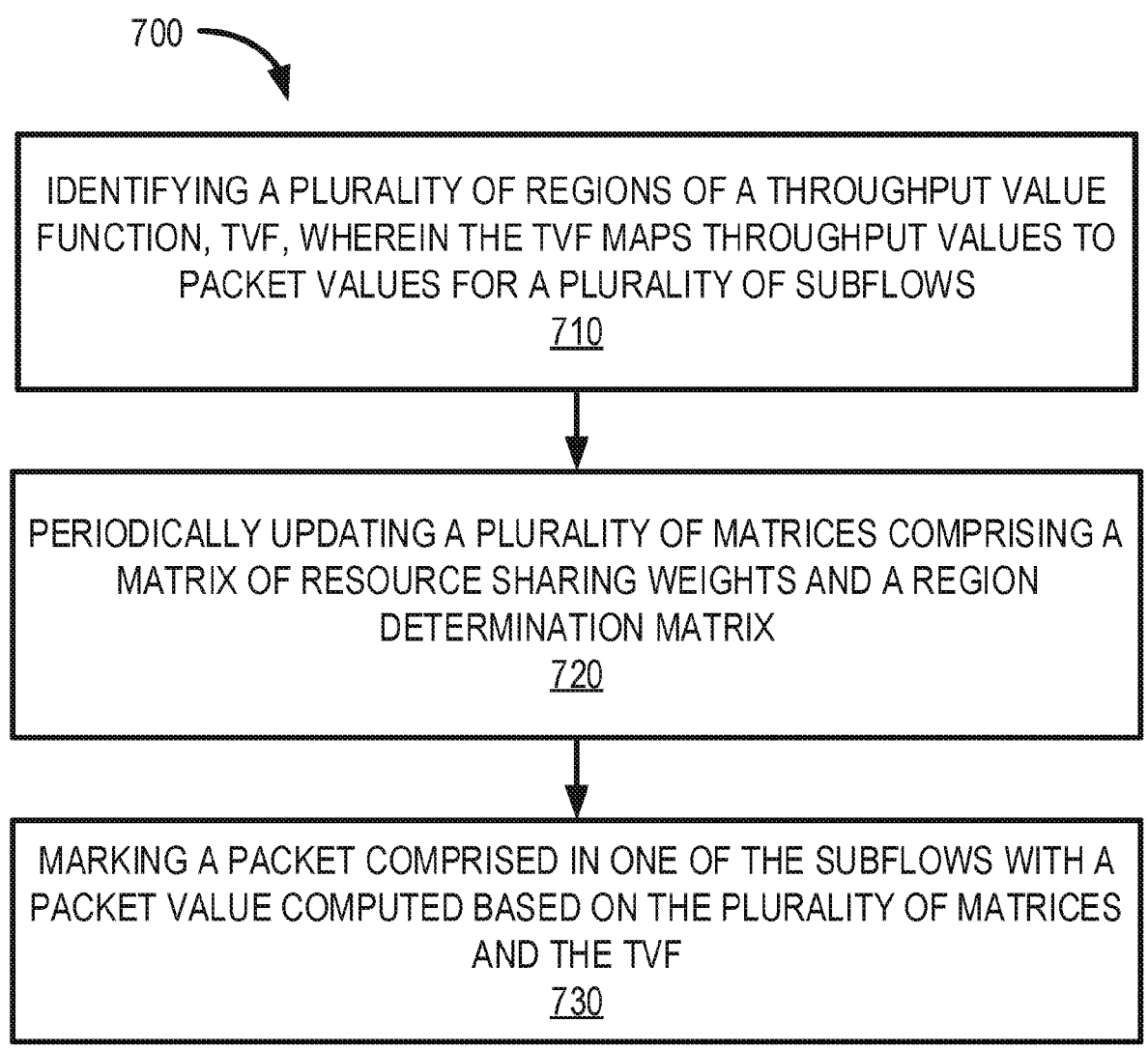
FIG. 16 is a flow diagram illustrating a further example method implemented by a computing device, according to one or more embodiments of the present disclosure.

In view of all of the above, particular embodiments of the present disclosure include a method 700 implemented by a computing device 150 (e.g., as illustrated in FIG. 16). The method 700 comprises identifying a plurality of throughput regions of a TVF 200 (block 710). The TVF 200 maps throughput values to packet values for a plurality of subflows. The method 700 further comprises periodically updating a plurality of matrices comprising a matrix of resource sharing weights and a region determination matrix (block 720). The method further comprises marking a packet with a packet value computed based on the plurality of matrices and the TVF (block 730). The packet 180 is received in one of the subflows.

Other embodiments include a computing device 150. The computing device 150 may perform one, some, or all of the functions described above, depending on the embodiment. In particular, the computing device 150 may be configured to perform the method 700 illustrated in FIG. 16, the method 300 illustrated in FIG. 7, and/or the method 400 illustrated in FIG. 9.

Figure 17:
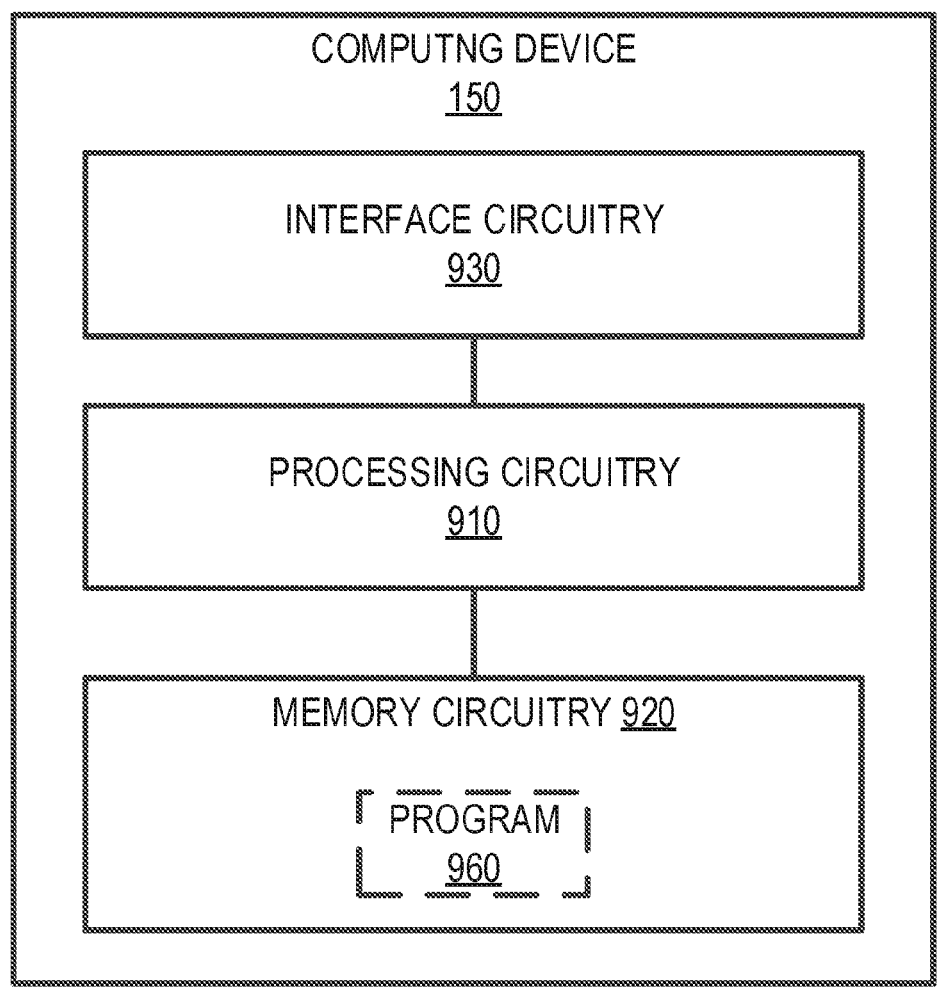
FIG. 17 is a schematic diagram illustrating an example computing device, according to one or more embodiments of the present disclosure.

In one example, the computing device 150 is implemented according to the hardware illustrated in FIG. 17. The example hardware of FIG. 17 comprises processing circuitry 910, memory circuitry 920, and interface circuitry 930. The processing circuitry 910 is communicatively coupled to the memory circuitry 920 and the interface circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may comprise a first processing circuit and a second processing circuit that are capable of executing functions in parallel.

The processing circuitry 910 may be programmable hardware capable of executing software instructions stored, e.g., as a machine-readable computer program 960 in the memory circuitry 920. The memory circuitry 920 may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930 may be a controller hub configured to control the input and output (I/O) data paths of the computing device 150. Such I/O data paths may include data paths for exchanging signals over a communications network 100. For example, the interface circuitry 930 may comprise one or more transceivers configured to send and receive communication signals over one or more packet-switched networks, cellular networks, and/or optical networks.

The interface circuitry 930 may be implemented as a unitary physical component, or as a plurality of physical components that are contiguously or separately arranged, any of which may be communicatively coupled to any other, or may communicate with any other via the processing circuitry 910. For example, the interface circuitry 930 may comprise output circuitry (e.g., transmitter circuitry configured to send communication signals over the communications network 100) and input circuitry (e.g., receiver circuitry configured to receive communication signals over the communications network 100). Other examples, permutations, and arrangements of the above and their equivalents will be readily apparent to those of ordinary skill.

According to embodiments of the hardware illustrated in FIG. 17, the processing circuitry 910 is configured to perform the method 700 illustrated in FIG. 16, the method 300 illustrated in FIG. 7, and/or the method 400 illustrated in FIG. 9. In some particular embodiments, the processing circuitry 910 is configured to identify a plurality of regions of a TVF 200. The TVF 200 maps throughput values to packet values for a plurality of subflows. The processing circuitry 910 is further configured to periodically update a plurality of matrices comprising a matrix of resource sharing weights and a region determination matrix. The processing circuitry 910 is further configured to mark a packet 180 with a packet value computed based on the plurality of matrices and the TVF 200. The packet 180 is received in one of the subflows.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a computing device, the method comprising:
   identifying a plurality of regions of a Throughput Value Function (TVF), wherein the TVF maps throughput values to packet values for a plurality of subflows;
   periodically updating a plurality of matrices comprising a matrix of resource sharing weights and a region determination matrix;
   marking a packet with a packet value computed based on the plurality of matrices and the TVF, wherein the packet is received in one of the subflows.

2. The method of claim 1, wherein the matrix of resource sharing weights indicates, for each of the subflows, a relative weight of the subflow in each of the regions.

3. The method of claim 1, wherein marking the packet with the packet value based on the plurality of matrices comprises:
   transforming a random rate parameter using a first value comprised in the matrix of resource sharing weights and a second value comprised in the region determination matrix;
   using the transformed random rate parameter as an input to the TVF to determine the packet value.

4. The method of claim 3, further comprising selecting the random rate parameter from a limited range of values comprising a maximum value, wherein the maximum value is a measured throughput of the subflow comprising the packet.

5. The method of claim 1, further comprising periodically receiving a rate measurement for each of the subflows, wherein periodically updating the region determination matrix comprises periodically updating the region determination matrix based on the rate measurements.

6. The method of claim 5, wherein identifying the plurality of regions of the TVF comprises calculating, for each of the regions of the TVF, a width of the region and an upper boundary of the region, wherein:
   the width of an initial region of the plurality of regions is calculated to be at least as wide as a smallest of the rate measurements combined with a proportional amount of each of the other rate measurements;
   the proportional amount, for each of the other rate measurements, being the other rate measurement weighted according to a resource sharing ratio between the subflow of the smallest rate measurement and the subflow of the other rate measurement;
   the upper boundary of the initial region is calculated as a lowest throughput value mapped by the TVF plus the width of the initial region.

7. The method of claim 6, wherein:
a remainder of each of the other rate measurements is the other rate measurement less the proportional amount of the other rate measurement;
the width of a region adjacent to the initial region is calculated to be at least as wide as the remainder of a smallest of the other rate measurements combined with a further proportional amount of each rate measurement larger than the smallest of the other rate measurements;
the further proportional amount being, for each of the rate measurements larger than the smallest of the other rate measurements, the remainder of the larger rate measurement weighted according to a resource sharing ratio between the subflow of the smallest of the other rate measurements and the subflow of the larger rate measurement;
the upper boundary of the region adjacent to the initial region is calculated as the upper boundary of the initial region plus the width of the region adjacent to the initial region.

8. The method of claim 1, further comprising receiving a resource sharing weight for each of the subflows, wherein periodically updating the matrix of resource sharing weights comprises periodically updating the matrix of resource sharing weights with a relative weight of each subflow in each of the regions of the TVF.

9. The method of claim 1, further comprising calculating an index reordering vector comprising identifiers of the subflows ordered by throughput-to-weight ratio.

10. The method of claim 9, wherein:
each of the subflows has a corresponding weight;
the method further comprises periodically determining, for each of the subflows and with respect to each of the regions of the TVF, a ratio of the weight of the subflow relative to a sum of the weights of the other subflows;
wherein periodically updating the plurality of matrices comprises periodically updating values of the matrix of resource sharing weights with the determined ratios of the weights according to the ordering of the index reordering vector.

11. A computing device comprising:
processing circuitry and a memory, the memory containing instructions executable by the processing circuitry whereby the computing device is configured to:
identify a plurality of regions of a Throughput Value Function (TVF), wherein the TVF maps throughput values to packet values for a plurality of subflows;
periodically update a plurality of matrices comprising a matrix of resource sharing weights and a region determination matrix;
mark a packet with a packet value computed based on the plurality of matrices and the TVF, wherein the packet is received in one of the subflows.

12. The computing device of claim 11, wherein the matrix of resource sharing weights indicates, for each of the subflows, a relative weight of the subflow in each of the regions.

13. The computing device of claim 11, wherein to mark the packet with the packet value based on the plurality of matrices, the computing device is configured to:
transform a random rate parameter using a first value comprised in the matrix of resource sharing weights and a second value comprised in the region determination matrix;
use the transformed random rate parameter as an input to the TVF to determine the packet value.

14. The computing device of claim 13, further configured to select the random rate parameter from a limited range of values comprising a maximum value, wherein the maximum value is a measured throughput of the subflow comprising the packet.

15. The computing device of claim 11, further configured to periodically receive a rate measurement for each of the subflows, wherein to periodically update the region determination matrix the computing device is configured to periodically update the region determination matrix based on the rate measurements.

16. The computing device of claim 15, wherein:
to identify the plurality of regions of the TVF the computing device is configured to calculate, for each of the regions of the TVF, a width of the region and an upper boundary of the region;
the width of an initial region of the plurality of regions is calculated to be at least as wide as a smallest of the rate measurements combined with a proportional amount of each of the other rate measurements;
the proportional amount, for each of the other rate measurements, being the other rate measurement weighted according to a resource sharing ratio between the subflow of the smallest rate measurement and the subflow of the other rate measurement;
the upper boundary of the initial region is calculated as a lowest throughput value mapped by the TVF plus the width of the initial region.

17. The computing device of claim 16, wherein:
a remainder of each of the other rate measurements is the other rate measurement less the proportional amount of the other rate measurement;
the width of a region adjacent to the initial region is calculated to be at least as wide as the remainder of a smallest of the other rate measurements combined with a further proportional amount of each rate measurement larger than the smallest of the other rate measurements;
the further proportional amount being, for each of the rate measurements larger than the smallest of the other rate measurements, the remainder of the larger rate measurement weighted according to a resource sharing ratio between the subflow of the smallest of the other rate measurements and the subflow of the larger rate measurement;
the upper boundary of the region adjacent to the initial region is calculated as the upper boundary of the initial region plus the width of the region adjacent to the initial region.

18. The computing device of claim 11, further configured to receive a resource sharing weight for each of the subflows, wherein to periodically update the matrix of resource sharing weights the computing device is configured to periodically update the matrix of resource sharing weights with a relative weight of each subflow in each of the regions of the TVF.

19. The computing device of claim 11, further configured to calculate an index reordering vector comprising identifiers of the subflows ordered by throughput-to-weight ratio.

20. The computing device of claim 19, wherein:
each of the subflows has a corresponding weight;
the computing device is further configured to periodically determine, for each of the subflows and with respect to each of the regions of the TVF, a ratio of the weight of the subflow relative to a sum of the weights of the other subflows;
wherein to periodically update the plurality of matrices, the computing device is configured to periodically update values of the matrix of resource sharing weights with the determined ratios of the weights according to the ordering of the index reordering vector.

21. A non-transitory computer readable medium storing a computer program product for controlling a computing device, the computer program product comprising software instructions that, when run on processing circuitry of the computing device, cause the computing device to:
- identify a plurality of regions of a Throughput Value Function (TVF), wherein the TVF maps throughput values to packet values for a plurality of subflows;
- periodically update a plurality of matrices comprising a matrix of resource sharing weights and a region determination matrix;
- mark a packet with a packet value computed based on the plurality of matrices and the TVF, wherein the packet is received in one of the subflows.

* * * * *